April 2, 1946. H. L. COX 2,397,471
METHOD OF PRODUCING STRAIN-FREE THERMOPLASTIC ARTICLES
Filed Nov. 18, 1942
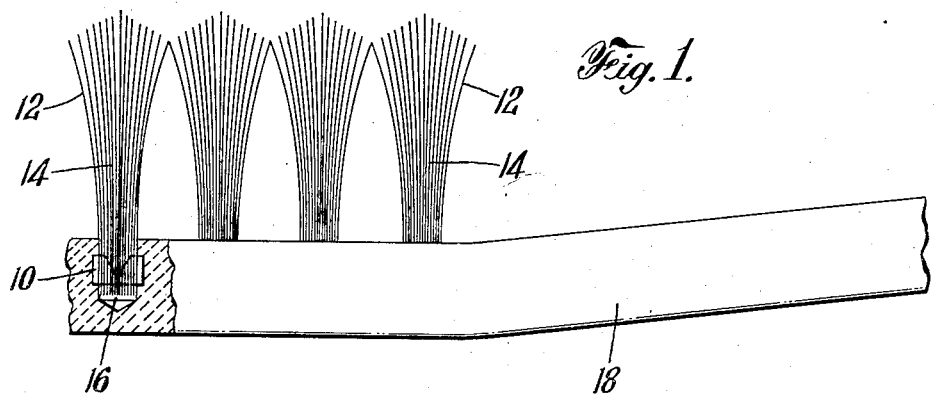
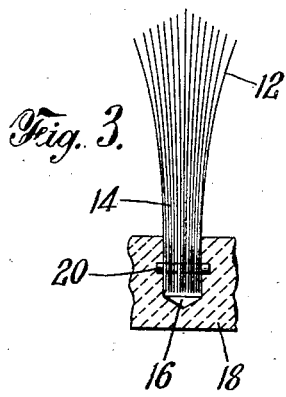
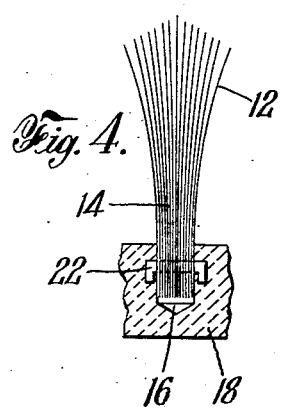
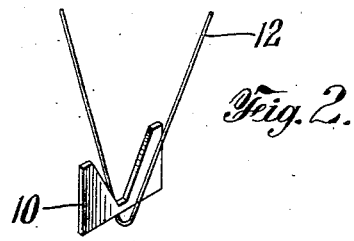
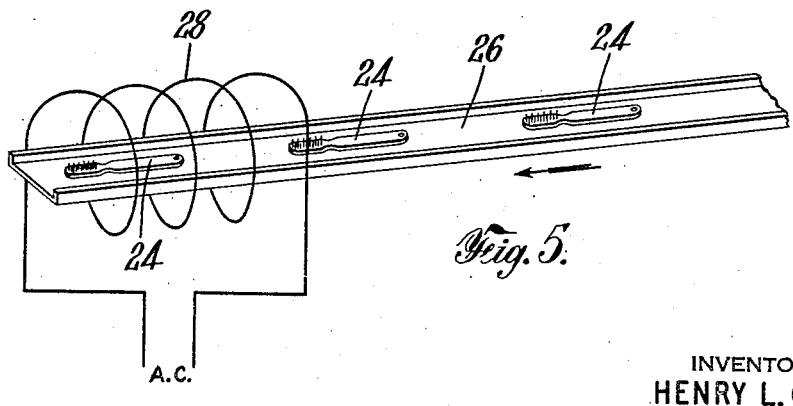
INVENTOR
HENRY L. COX
BY
Charles C. Scheffler
ATTORNEY

UNITED STATES PATENT OFFICE 2,397,471

METHOD OF PRODUCING STRAIN-FREE THERMOPLASTIC ARTICLES

Henry L. Cox, South Charleston, W. Va., assignor to Carbide and Carbon Chemicals Corporation, a corporation of New York Application November 18, 1942, Serial No. 465,992

7 Claims. (Cl. 300—21)

This invention relates to a method for relieving internal localized strain in thermoplastic articles by subjecting such articles to induction heating, and to thermoplastic articles substantially free of internal localized strain.

The molding or extrusion of thermoplastic material to a desired shape and thereafter subjecting such molded or extruded shape to mechanical processing operations, is widely practiced in industry. The extruding or molding operation usually depends on the use of molds or matrices into which a plastic composition is forced under conditions of elevated temperature and high pressure, and such molding or extruding operation may induce considerable internal strain in the molded or extruded material. Although such strain, which is usually uniformly distributed throughout the thermoplastic material, may be partially or completely released by heating the molded shape to a suitable temperature, the release of such strain to any appreciable degree may cause dimensional change or distortion of the shape. By subjecting the molded or extruded thermoplastic shape to mechanical processing operations which impart internal localized or concentrated strains therein, the final product may contain such a high degree of strain as to be weak and commercially unsatisfactory. In order to provide a strong and commercially satisfactory thermoplastic article, it is highly desirable to relieve the internal localized or concentrated strain without relieving, to an appreciable degree, the generally distributed strain which may be present in the thermoplastic material.

For purposes of illustration and explanation the invention will be described as applied to the manufacture of brushes, particularly tooth brushes, but it is to be understood that the invention is not so limited nor is its application related solely to the manufacture of brushes.

Brushes, especially tooth brushes, having thermoplastic backs or heads are usually manufactured from a thermoplastic shape or blank which has been extruded or molded at a suitable temperature and pressure. After the resulting shape has cooled to a temperature below the softening point of the thermoplastic material, it is subsequently drilled or otherwise provided with suitable cavities for receiving tufts of bristles. In order to anchor or lock a tuft of bristles in each of the cavities, a metallic insert or pin may be forced into the cavity simultaneously with the tuft. This metallic insert or pin may assume various shapes and it generally extends through the tuft of bristles and positively engages the wall of the cavity at two or more points. Preferably, the metallic insert is forced into the cavity to a point below the surface of the article and approximately midway of the depth of such cavity. The mechanical operation of forcing the tuft of bristles and insert into each of the cavities in the thermoplastic brush results in the formation of channels in the walls of the cavity and also creates considerable internal localized strain in the plastic in the vicinity of the insert. In some instances such strain may be sufficiently large to cause the subsequent formation of cracks in, or splitting of, the thermoplastic material particularly at points where the metal insert pierces the latter.

Due to the comparatively low thermal conductivity of thermoplastic material, in general, known methods of applying external heat to the surface of the plastic, for the purpose of relieving or removing internal localized strain therein and of sealing small cracks or channels in the plastic have not been entirely satisfactory. It is difficult to adequately relieve internal localized strain in the heads of thermoplastic brushes and effectively seal the bristle-retaining insert in the plastic by the application of external heat without deleteriously affecting the finish of the plastic or injuring the bristles or causing distortion of the brush. The application of external heat usually does not effectively seal any channels or cracks which may be present in the plastic material adjacent the metallic insert.

The present invention provides an improved method of relieving internal localized strain in thermoplastic articles, such as brushes, in a manner which overcomes the above and other difficulties heretofore encountered, and provides a thermoplastic article or brush substantially free of internal localized strain. In general, the method of the invention is effected by subjecting the article or brush having a metallic insert in or adjacent the region of internal localized strain, to induction heating whereby such insert is heated to a temperature sufficient to heat the plastic internally in the region adjacent to the ends of the insert to a strain-relieving temperature and preferably to a temperature slightly above the softening temperature of the plastic material.

In the drawing:

Fig. 1 is an elevational view, partly in section, of a thermoplastic brush, such as a tooth brush, illustrating a tuft of bristles anchored in the plastic material by a metallic insert;

Fig. 2 is an enlarged view of the bristle-retaining metallic insert, shown in Fig. 1;

Fig. 3 is a sectional view of a tuft of bristles anchored in the plastic by a metallic insert having the form of a pin or bar;

Fig. 4 is a sectional view of a tuft of bristles anchored in the plastic by an inverted U-shaped metallic insert; and Fig. 5 is a diagrammatical isometric view of an apparatus for inductively heating brushes containing bristle-retaining metallic inserts.

Various kinds of thermoplastic compositions may be successfully employed in the practice of this invention. For example, compositions containing cellulose esters or derivatives thereof may be employed or, if desired, the plastic composition may contain or consist of an artificial resin such as of polystyrene, methyl methacrylate, or similar resinous material. Compositions containing vinyl resins are preferred, and among the vinyl resins which are particularly suited for use are those such as may be made by the conjoint polymerization of vinyl halides with vinyl esters of aliphatic acids. Examples of suitable vinyl resins are those resulting from the conjoint polymerization of vinyl chloride with vinyl acetate and which contain in the polymer from about 70% to 95% of vinyl chloride. Resins of this class are disclosed in Patent No. 1,935,577, to E. W. Reid.

With reference to Figs. 1 and 2, the bristle retaining metallic insert is in the form of a relatively thin plate 10 having a V-shaped notch centrally located in the upper portion thereof. The diameter of each bristle tuft 14 closely corresponds to the diameter of the cavity 16 in the thermoplastic material 18, and each bristle 12 of the tuft is bent around the plate 10. The length of the plate 10 is slightly greater than the diameter of the cavity 16, so that when the bristle tuft 14 and insert or plate 10 are simultaneously wedged or forced into the cavity 16, with the consequent generation of localized strain in the plastic material, the end portions of the plate extend into the walls of the cavity and thereby anchor the tuft of bristles securely to the plastic material.

In Figs. 3 and 4 the bristle-retaining insert is shown as a pin 20 or an inverted U-shaped bar 22, respectively. If the metallic insert is employed in the form of a pin 20, the plastic region heated by the ends of such pin, when the latter is inductively heated, is considerably smaller than the plastic region heated by the somewhat wider ends of plate 10, or by the still wider ends of inverted U-shaped bar 22. Thus, by varying the shape and size of the end portions of the metallic insert the extent of the internal heating of the thermoplastic material in the vicinity of the cavity may be varied as desired. Preferably, the insert is of a size and shape, when inductively heated, to heat uniformly substantially all of the strained portion of the plastic adjacent thereto without substantially heating the remainder of the plastic or injuring the bristles or causing the plastic to become overheated or discolored. In general, the bristle-retaining metallic inserts may be made of any suitable metal, e. g., copper, brass, steel or the like, which can be inductively heated to an elevated temperature by an alternating magnetic field without discoloring or otherwise injuriously affecting the thermoplastic material. Non-magnetic metals, such as brass or copper, become heated in an alternating magnetic field at a somewhat slightly slower rate than steel or other magnetic susceptible metals, and the latter type of metal may be employed to advantage in those instances when it is desired to reduce the heating period to a minimum.

Fig. 5 diagrammatically illustrates one method of inductively heating a portion only of the heads of thermoplastic tooth brushes having metallic bristle-retaining inserts disposed in the heads thereof. The brushes 24 may be placed on a suitable conveyor 26 which transports them through an alternating magnetic field of suitable strength to heat the metallic inserts and plastic adjacent the latter to a desired temperature. The interval which the brushes are permitted to remain in the alternating magnetic field of the induction furnace 28 and the intensity of such magnetic field are so correlated as to secure the release of substantially all internal localized strain in the head of the brush and to effect the bonding of the ends of the insert in the plastic without substantially heating the head of such brush or causing any dimensional change or distortion thereof. Preferably, the insert is heated to a temperature somewhat above the softening temperature of the thermoplastic material thereby sealing any channels, cracks or similar defects in the plastic in the vicinity of the insert. If the correlation between the duration of heating and the intensity of the magnetic field is not sufficient to heat the bristle-retaining metallic insert to a proper temperature, localized strain in the plastic will not be effectively relieved and adequate bonding of the insert in the plastic will not be secured. Any correlation between duration of heating and intensity of magnetic field is to be avoided which causes overheating of the inserts or results in injury to the bristles, discoloration of the plastic or distortion of the head of the brush. In general, the brushes may be heated in batches or passed continuously through any suitable type of induction furnace which effectively heats the metallic inserts to the desired temperature. The frequency of the alternating current supplied to the furnace is not critical and such current may be supplied from any suitable source having a frequency of from about 20 to 10,000 cycles, or more, per second.

A brush having a thermoplastic head made of the vinyl resin described in the previously mentioned Patent No. 1,935,577 to E. W. Reid, and having its bristle tufts retained in such resin by a brass pin, may be substantially freed of internal localized strain and the insert effectively bonded in the plastic by subjecting such brush to induction heating. Preferably, the intensity of the alternating magnetic field of the induction furnace is adjusted to a value such that the brass pins or inserts are heated to a temperature of between about 125° C. and 160° C. in a period of not more than about 25 seconds.

Heads of tooth brushes made from the previously mentioned vinyl resin and inductively heat-treated in the manner described above, have a considerably higher Izod impact strength than the heads of similar brushes which have not been inductively heat-treated. Izod impact tests were carried out by initially shaving-off the bristles from the head of the brush so that the bristles were level with the surface of the plastic. This head was then clamped in the Izod testing machine in a position such that the head was broken in a direction perpendicular to the longitudinal axis of the brush. Each specimen was broken in the same relative place. The average energy required to break a head which was not inductively heat-treated was 0.163 foot pound. The average energy required to break an identical head which was subjected to induction heating was 0.217 foot pound, representing an increase of about 33% in the impact strength of the head of the brush. Thus, by the practice of this invention the strength of a thermoplastic brush in the bristled section may be materially improved and at the same time the possibility of delayed breakage of such brush due to concentrated localized strain in the head thereof, is completely eliminated.

While a certain advantageous embodiment of the invention has been described, the invention is in no sense limited thereby and may be otherwise employed and practiced without departing from the scope thereof.

I claim:

1. A method for relieving localized internal strain in thermoplastic brushes, such strain being produced by introducing at least one tuft of bristles and a metallic bristle-retaining insert into a cavity in said plastic, which comprises subjecting the brush to the influence of an alternating magnetic field to heat said metallic insert inductively and thereby to heat the plastic internally, in a region adjacent to said insert only, to a temperature above the softening temperature of said plastic, and to effect the release of said strain and the bonding of said plastic with said metallic insert and said tuft of bristles without substantially heating the remainder of the plastic.

2. A method for producing a brush having a strain-relieved thermoplastic head which is substantially freed from internal localized strain at least partly caused by forcing a tuft of bristles and a tuft-retaining metal insert into an unheated cavity in said plastic, which comprises subjecting said head to induction heating only, the shape of said insert and the correlation between the duration of heating and the intensity of the alternating magnetic field producing said induction heating being adjusted to obtain the internal heating of the plastic in a region adjacent to said insert only, at least to a localized strain-relieving temperature without substantially heating the remainder of the head of said brush.

3. A method for manufacturing brushes each having a plastic composition head substantially freed from internal localized strain at least partly caused by wedging a tuft of bristles and a tuft-retaining metal insert into an unheated cavity in said head, said composition containing a vinyl resin obtainable by the conjoint polymerization of a vinyl halide with a vinyl ester of an aliphatic acid, which comprises subjecting the head of the brush to the influence of an alternating magnetic field for a period of time sufficient to heat said insert inductively to a temperature from about 125° C. to about 160° C., and thereby to obtain the heating of the plastic internally in a region adjacent to said insert only, and to effect the release of said strain and the bonding of said composition with said insert and said tuft of bristles without substantially heating the remainder of the head of said brush.

4. A method of rapidly relieving internal localized strain in the heads of thermoplastic brushes having at least one tuft of bristles retained in a cavity in one of said heads by a metal insert which extends through said tuft and into the walls of said cavity, said tuft and insert having been set into said cavity under conditions producing at least a portion of said internal strain, said method comprising subjecting said head to the influence of an alternating magnetic field to heat said insert inductively and thereby to heat said plastic internally, in the vicinity of said insert and adjacent to the wall of said cavity only, to a temperature sufficient to relieve said strain without substantially heating the remainder of said plastic.

5. A method for manufacturing a thermoplastic article containing at least one metallic insert at least partly enclosed in said article, which comprises hot-forming the thermoplastic article, forcing the insert into the article when the latter is in a cooled and solid state, thereby producing localized strains in the plastic material in the vicinity of the insert, thereafter inductively heating said insert by an alternating magnetic field and internally heating, solely by conduction from said insert only, the thermoplastic material in a region immediately adjacent to said insert until said strains have been relieved, and then removing the thermoplastic article from the influence of the alternating magnetic field.

6. A method for manufacturing a thermoplastic article containing at least one metallic insert at least partially enclosed in said article, which comprises hot forming the thermoplastic article, forcing the insert into the article when the latter is in a cooled and solid state, thereby producing localized strains in the plastic material in the vicinity of the insert, thereafter inductively heating said insert by means of an alternating magnetic field and internally heating, solely by conduction, the thermoplastic material in a region immediately adjacent to said insert to a temperature above its softening temperature until said strains have been relieved and the insert has been bonded by the thermoplastic, and then removing the thermoplastic article from the influence of the alternating magnetic field.

7. A method for manufacturing articles having a metal insert disposed in a thermoplastic material which is substantially freed from internal localized strain at least partly caused by wedging said insert into a cavity in said material, said material containing a vinyl resin obtainable by the conjoint polymerization of a vinyl halide with a vinyl ester of an aliphatic acid, which comprises subjecting said article to the influence of an alternating magnetic field for a period of time sufficient to heat said insert inductively to a temperature from about 125° C. to about 160° C. and thereby to obtain the heating of the plastic material internally in a region adjacent to said insert only, and to effect the release of said strain and the bonding of said plastic material with said insert without substantially heating the remainder of said plastic material.

HENRY L. COX.